Sept. 16, 1958 N. GRUBELIC 2,851,780
PAINT MEASURING DEVICES
Filed Sept. 19, 1955 3 Sheets-Sheet 1

INVENTOR.
NICHOLAS GRUBELIC
BY
ATTORNEY

Sept. 16, 1958　　　　　　N. GRUBELIC　　　　　　2,851,780
PAINT MEASURING DEVICES
Filed Sept. 19, 1955　　　　　　　　　　　　3 Sheets-Sheet 2
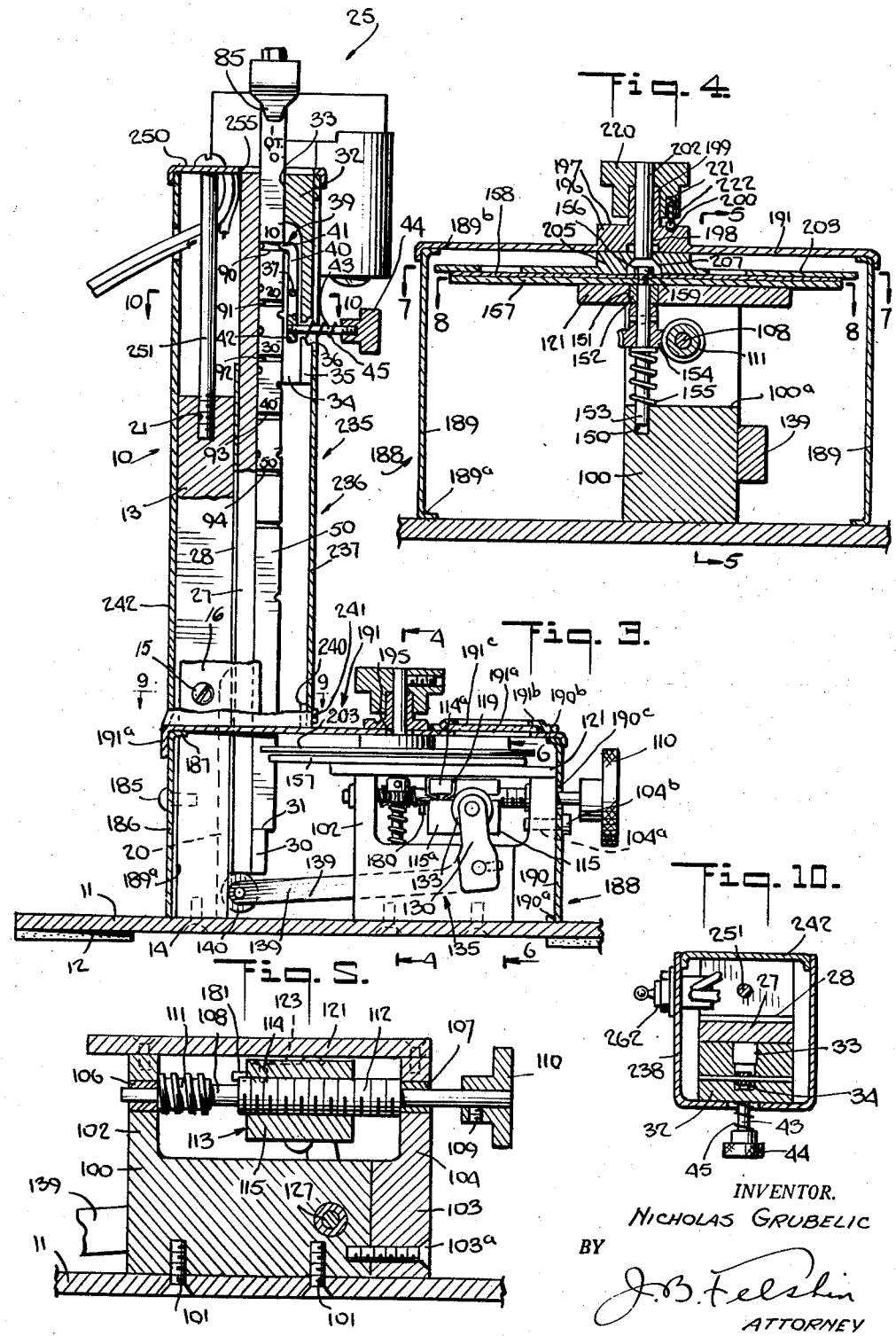
INVENTOR.
NICHOLAS GRUBELIC
BY
J. B. Felshin
ATTORNEY

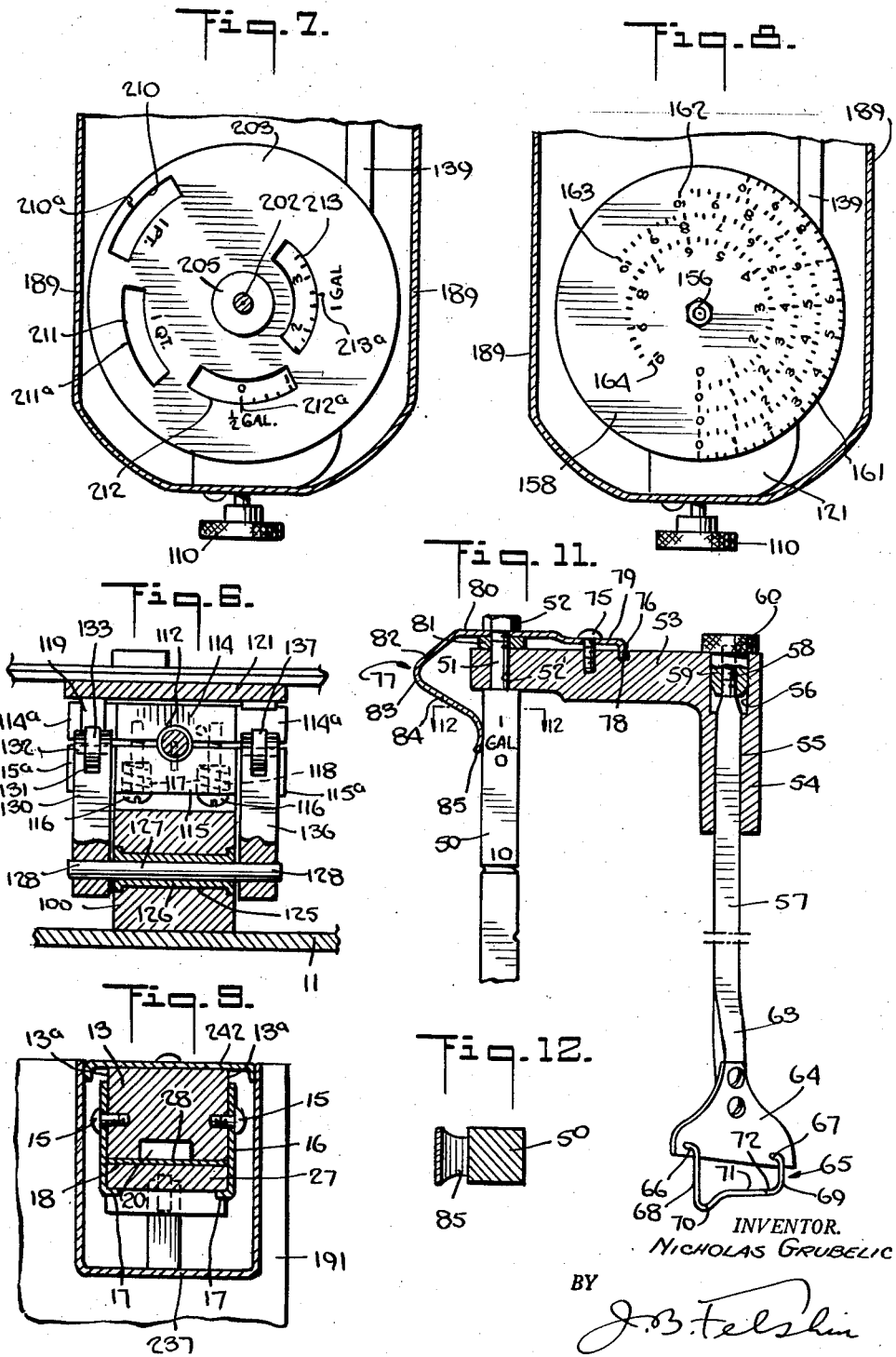

United States Patent Office 2,851,780
Patented Sept. 16, 1958

2,851,780

PAINT MEASURING DEVICES

Nicholas Grubelic, Williston Park, N. Y.

Application September 19, 1955, Serial No. 534,992

10 Claims. (Cl. 33—126.7)

This invention relates to paint measuring devices. It is particularly directed to a machine for measuring standard paints poured into a paint can according to formula to produce a can full of paint of desired color.

One object of this invention is to provide in a machine of the character described, a highly improved level indicator member including a wire level indicator loop to facilitate the visual indication of the level of paint in a can.

Prior paint measuring machines were provided with a level indicator which was raised by turning a knob or operating a screw controlling a graduated scale. In such machines, the scale indicated measurements up to the full height of the can and the full range of the formula. Such prior machines, therefore, necessitated considerable knob or screw and scale movement, and the movement of the paint level indicator was for fine adjustment.

In accordance with the present invention, the full movement of the level indicator for each size can is divided into a plurality of distances, means being provided to permit manually and quickly moving the indicator through one or more of such equal distances and to retain same in such position, and a knob or screw being operated only for fine adjustment raising of the level indicator a desired portion of one of said equal distances according to scale readings on a scale controlled by said knob or screw operation. With such construction, it is unnecessary to turn the knob to raise the level indicator the full height of the can or receptacle to be filled with paint, but at most, to only raise the level indicator through one division of such height.

Another object of this invention is to provide a mixing machine of the character described which may be used for mixing either pint, quart, one-half gallon or gallon cans of paint, and for each of these cans, the level indicator may be lifted to any desired division of the full height, and a dial may then be rotated by means of a knob to measure the distance between adjacent divisions of the full height.

In accordance with the present invention, the dial comprises four different scale readings concentric with respect to the center of the dial. All of the scale readings start on one radial line, but, of course, the quart scale necessitates rotation through a greater angle than the pint scale. The one-half gallon scale has a greater angle than the quart scale, and the gallon scale has a greater angle than the one-half gallon scale. This is true because the quart paint can is taller than the pint can; the half gallon can is taller than the quart can, and the gallon can is taller than the half gallon can.

In accordance with the present invention there is further provided a rotary plate coaxial with the dial plate and having four arcuate window openings set at radial different distances from the center and offset angularly from one another, so as to selectively uncover parts of the scales, means being further provided to retain the plate in various angular positions of use for reading the pint, quart, half gallon or gallon scales.

Yet another object of this invention is to provide in a machine of the character described a pair of members slidable vertically one with respect to the other, and a third member slidable vertically relative to one of said pair of members, means to cause a rough vertical adjustment of one of said members, and means to cause a fine adjustment of another of said members.

Still a further object of this invention is to provide a strong, rugged and durable machine of the character described, which shall be relatively inexpensive to manufacture, and which shall yet be easy to manipulate and practical, accurate and efficient to a high degree in use.

Other objects of this invention will in part be obvious and in part hereinafter pointed out.

The invention accordingly consists in the features of construction, combinations of elements, and arrangement of parts, which will be exemplified in the construction hereinafter described, and of which the scope of invention will be indicated in the appended claims.

In the accompanying drawings in which is shown various illustrative embodiments of this invention:

Fig. 3 is a cross-sectional view taken on line 3—3 of Fig. 2;

Fig. 4 is a cross-sectional view taken on line 4—4 of Fig. 3;

Fig. 5 is a cross-sectional view taken on line 5—5 of Fig. 4;

Fig. 6 is a cross-sectional view taken on line 6—6 of Fig. 3;

Fig. 7 is a cross-sectional view taken on line 7—7 of Fig. 4;

Fig. 8 is a cross-sectional view taken on line 8—8 of Fig. 4;

Fig. 9 is a cross-sectional view taken on line 9—9 of Fig. 3;

Fig. 10 is a cross-sectional view taken on line 10—10 of Fig. 3;

Fig. 11 is a side elevational view of the level indicating unit with parts in cross-section; and Fig. 12 is a cross-sectional view taken on line 12—12 of Fig. 11.

Figure 1:
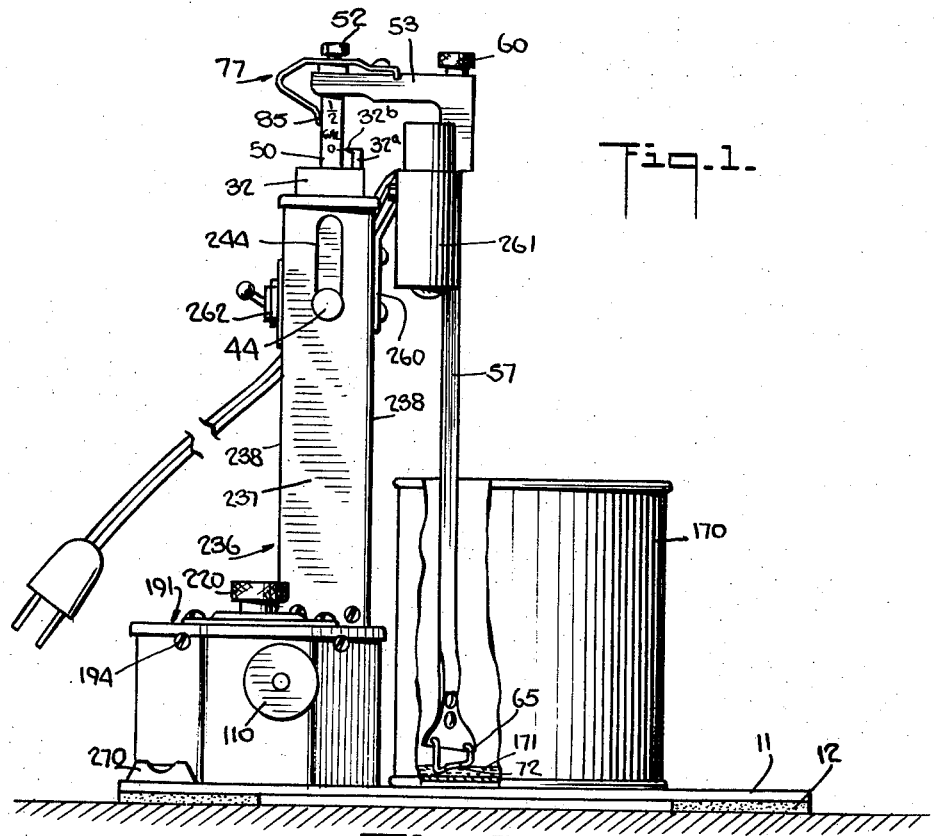
Fig. 1 is a front elevational view of a machine embodying the invention and showing a can in position for measuring fluid poured therein.
Figure 2:
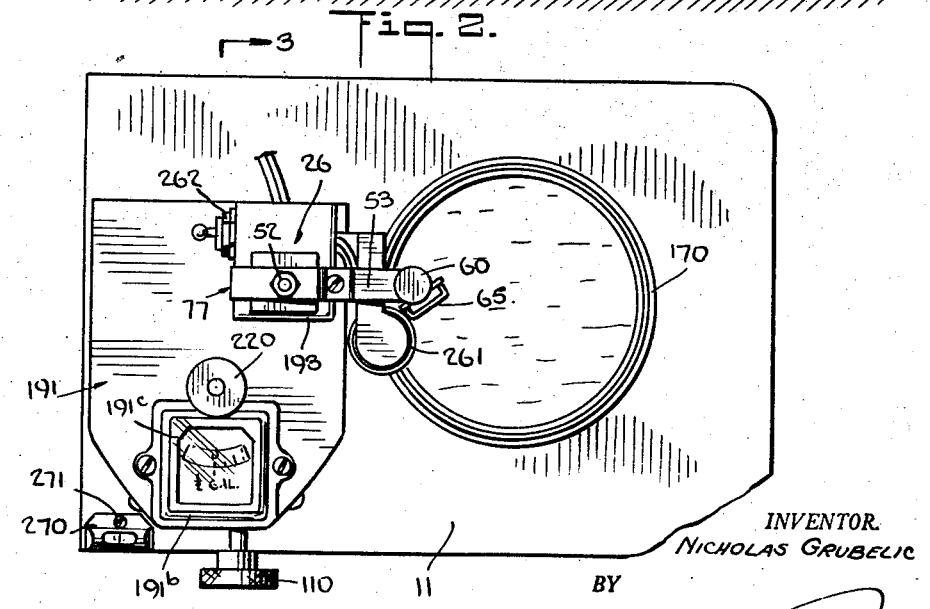
Fig. 2 is a top plan view of the structure shown in Fig. 1.

Referring now in detail to the drawing, 10 designates a paint measuring machine embodying the invention. The same comprises a rectangular base plate 11 to the underside of which may be attached corner rubber supporting pads 12. Fixed to the base plate 11 is an upstanding post 13 of rectangular cross-section. Said rod may be fixed in place by a pair of screws 14 or in any other suitable manner.

Attached to the side surfaces 13a of the post 13, as by screws 15, are guide plates 16. The plates 16 extend forwardly of the posts 13 and have aligned inwardly projecting vertical flanges 17 spaced from the front surface 18 of said post. Said post 13 is formed adjacent its lower end and at its front side with a vertical groove 20 for the purpose hereinafter appearing. The post 13 is formed at its upper end with a downwardly extending screw threaded blind opening 21, for the purpose to be explained hereinafter.

Mounted on the post 13 is a level indicating unit 25. The unit 25 comprises a slider 26. Slider 26 comprises a bar 27 received between the guide plates 16 and engaging the inner surfaces of the flanges 17.

Fixed to the rear surface of bar 27 is a thin plate 28 contacting the front surface of the post 13. Attached to the lower end of the front face of the bar 27 is a stop plate 30 having an upper shoulder 31. Fixed to the front face of the upper end of the bar 27 is a block 32 formed at its rear side with a rectangular opening 33 extending therethrough.

Extending forwardly from the lower end of the rectangular opening 33 is a groove extension 34. The opening 33 is shown for the purpose of illustration as rectangular in shape. Forwardly of the groove 34 in block 32 is formed a wall 35. Wall 35 is formed with an externally countersunk through-opening 36. Fixed within the block 32 is a horizontal transverse pin 37 crossing the groove 34 above its lower end. Pivoted about to the axis of pin 37 is a lever 39 located in groove 34. Lever 39 has an upper arm 40 formed with a rearwardly extending horizontal finger 41. Said lever also has a lower arm 42. Screwed thereto is a pin 43 passing loosely through the countersunk opening 36 and projecting forwardly of the block 32. Screwed to the front end of the pin 43 is a head 44. Between the head 44 and the countersunk portion of the opening 36 is a coil compression spring 45. The spring 45 serves to bias the lever 39 in a counter-clockwise direction, looking at Fig. 3 of the drawing. When the head 44 is pressed rearwardly, or to the left, looking at Fig. 3, the lever 39 is rotated in a clockwise direction.

The lever indicating unit 25 further comprises a polygonal rod 50 (here shown square) slidably extending through the square opening 33 in the block 32. The lower end of the rod 50 may rest on the upper shoulder surface 31 of the stop plate 30. When the rod rests on the stop plate 30, the upper end of said rod projects upwardly above the upper end of the block 32. The upper end of the block 32 is at the level of the upper end of the bar 27 shown in Fig. 3 of the drawing.

Extending upwardly from the upper end of the rod 50 is a vertical pin 51. Screwed to the upper end of the pin 51 is a nut 52. The rod 50 has four faces. The pin 51 is journaled within a vertical opening 52' in a cross head 53, disposed at right angles to the rod (see Figs. 1 and 11). At the outer end of the cross head 53 is a downwardly extending extension 54. The extension 54 is formed at its lower end with a rectangular vertical opening 55. At the upper end of the rectangular opening 55 is an enlarged cylindrical opening 56. Slidably mounted within the rectangular opening 55 is a rod 57 having a screw threaded upper end 58. Projecting into the enlarged opening 56 and screwed to the upper screw threaded end 58 is a nut 59 rotatably received within the opening 56 and formed with an externally knurled head 60 at its upper end. By rotating the nut 59, the rod 57 may be raised and lowered for small distances and the vertical position of the rod 57 may be controlled to fine adjustments in this manner.

The lower end of the rod 57 is somewhat twisted as at 63. Attached to the lower twisted portion 63 is a substantially triangular plate 64. Fixed to the lower end of the plate 64 is a wire level indicator loop 65. The wire level indicator loop 65 comprises portions 66 and 67 fixed to the front face of plate 64 and projecting forwardly therefrom. Extending down from portion 66 is a vertical portion 68, and extending down from portion 67 is a vertical portion 69. Portion 68 extends downwardly further than portion 69. Extending from the lower end of portion 68 is an upwardly curved portion 70 from which extends an upwardly and outwardly inclined portion 71 joined to the lower end of portion 69. On portion 71 there may be placed an indicating mark 72 for the purpose hereinafter appearing.

Screwed to the upper side of the cross head 53 is a headed screw 75. The upper surface of the cross head 53 is formed with a transverse groove 76. Mounted on the cross head is a spring 77 made of strip spring material. The spring 77 has at one end, a downwardly extending lip portion 78 projecting into the groove 76. Extending from portion 78 is a horizontal portion 79 formed with an opening through which the shank of the screw 75 passes. The head of the screw 75 contacts the top of said portion 79. Extending from portion 79 of the spring 77 is a horizontal portion 80 formed with an opening through which the vertical pin 51 passes. The nut 52 screwed to the upper end of the pin 51 contacts the top of portion 80 of the spring 77. Between said portion 80 and the top of the cross head 53 are a pair of washers 81 surrounding the pin 51. Extending from portion 80 of spring 77 is a downwardly inclined portion 82 from which extends a bent back portion 83. Extending from the bent back portion 83 is a portion 84 inclined downwardly oppositely to portion 82 and terminating in a spring finger 85 contacting one face of the rod 50.

It will now be understood that the spring finger 85 always contacts one face of the rod 50 and holds said rod in one of four angular positions relative to the axis of the rod. However, the rod 50 may be withdrawn upwardly from opening 33, rotated through 90° angles about its longitudinal axis to successively bring different faces into contact with the spring finger 85, and then reinserted into said opening. The purpose of this construction will appear hereinafter.

One face of rod 50 is used when formulating paint in a gallon can. Another face is used when formulating paint in a one-half gallon can of paint. Still another face is used when formulating paint in a quart can, and the fourth face is used when formulating paint in a pint can. The pint, quart, half gallon and gallon cans are of standardized heights.

The quart face of the rod 50 is illustrated in Fig. 3 of the drawing. The various faces may be appropriately marked to indicate the gallon, one-half gallon, quart and pint faces. All faces have an "0" mark near their upper ends. The "0" marks are all at the same vertical height.

The machine, for the purpose of illustration, is shown in the drawings as a machine for formulas going up to 50 parts with each part divided into fourths. On each face of the rod 50, therefore, there are marks to indicate height readings of "10," "20," "30," "40" and "50." The distance between these markings are of course least for the pint and greatest for the gallon.

The distance between the "0" and "50" on the pint face is equal to the height of the pint can. The distance between "0" and "50" on the quart face is equal to the height of a quart can. The distance between "0" and "50" on the half gallon face is equal to the height of a half gallon can. The distance between the "0" and "50" on the gallon face is equal to the height of a gallon can.

Below each of the "10," "20," "30," "40," "50" indicating marks of each of the four faces is a groove or notch. The grooves for the quart face of the rod 50 is indicated by numerals 90, 91, 92, 93 and 94. The finger 41 of the lever 39 is adapted to snap into the various grooves. Thus, if the finger 41 is received in the groove 90 just below the "10" mark of the quart face of the rod 50, the level indicator will be at "10." The zero mark will show above the top of the block 32.

Fixed to the top of block 32 at one side of opening 33, is a lug 32a having a pointer 32b pointing toward the rod 50 at the level of the "0" marks on said rod when said rod rests on the stop 30. Said pointer will point to the "10," "20," "30" or "40" marks when the rod is maintained in raised position.

If it is desired to raise the level indicating unit 25 to a reading of "10," the head 44 is pressed inwardly to retract the finger 41 and then the rod 50 together with the cross head is raised so that the finger 41 clears the notch from which it has been removed. The head 44 is then released and the rod 50 is further raised until the finger 41 snaps into the groove below the "20" mark, thus bringing the "10" mark to a position above the upper end of the block 32 and opposite to the pointer 32b. In this manner the rod 50, together with the cross head and the rod 57 may be raised to present an initial reading of "0," "10," "20," "30" or "40," and this is true irrespective of whether one is measuring a pint, quart, half-gallon or gallon since the rod 50 may be turned to bring either the pint, quart, one-half gallon or gallon faces into contact with the spring finger 85. The face at the front of the rod 50 will always be the face that determines in what size can the paint is to be measured. For example, when the spring 85 is contacting the quart face of rod 50, as shown in Fig. 3, the measurement is for pints, since the pint face is then at the front. It will be noted that the notches in different faces of rod 50 are located at different positions longitudinally of said rod.

Means is provided to obtain a fine adjustment between "0" and "10," or between "10" and "20," or between "20" and "30," or between "30" and "40," or between "40" and "50" for either pint, quart, one-half gallon, or gallon paint cans. To this end there is attached to the top surface of base plate 11, and forwardly of the post 13, a block 100. The block 100 may be attached to the plate 11, as shown in Fig. 5 by means of screws 101. Block 100 is provided at its rear side with an upwardly extending projection 102. Fixed to the front of the block 100 is a block 103 having at its front side an upwardly projection 104. The upper ends of the projections 102 and 104 are at the same horizontal level. The block 103 is attached to the block 100 by means of a screw 103a. Within the projections 102 and 104 are a pair of horizontally aligned bearings 106 and 107 in which is journaled a horizontal shaft 108 extending from front to rear.

Fixed to the front end of the shaft 108 as by means of a set screw 109, is a knob 110. On shaft 108 and just forwardly of the journal 106 is a worm 111. On said shaft and forwardly of the worm 111 is an externally screw threaded portion 112. On the threaded portion 112 is a two-part split nut 113 comprising an upper half nut 114 and a lower half nut 115. The parts 114 and 115 are half nuts engaging opposite sides of the threaded portion 112. Screwed to the upper half nut 114 and extending downwardly therefrom are headed screws 116 passing through countersunk openings 117 in the underside of the half nut 113. Between the heads of the screws 116 and the ends of the countersunk openings 117 are coil compression springs 118 which press the half nuts together against opposite sides of the threaded portion 112. The half nuts 113, 114 at their rear ends have outwardly extending wings 114a and 115a, respectively. Surrounding one of the wings 114a is a spring 119. Fixed to the upper ends of the extensions 102, 104 is a top horizontal plate 121 contacted by the spring 119. Fixed to the top of the other wing 114a is one end of a leaf spring 123 having an outer free end contacting the underside of the plate 121 to press the top half nut downwardly.

The block 100 is formed with a transverse horizontal through-opening 125 in which is fixed a bearing 126. Extending from the bearing 126 is a horizontal transverse pin 127 having outer ends 128 projecting beyond the sides of the block 100. Fixed to one end 128 of the pin 127 is an arm 130 slotted at its upper end, as at 131, and carrying a transverse pin 132 on which is mounted a roller 133 received in the slot. Fixed to the other end 128 of the pin 127 is a bell crank 135 having an upwardly extending arm 136 similar to arm 130 and aligned therewith, and likewise carrying a roller 137 at its upper end. The rollers 133 and 137 contact the front faces of wings 115a of the lower half nut 115. Extending rearwardly from the arm 136 of bell crank 135 is an arm 139 carrying a roller 140 at its outer end and engaging beneath the lower end of the bar 27 and projecting into slot 20.

It will now be understood that when the knob 110 is rotated, the nut 113 will move longitudinally relative to the shaft 108. When the nut 113 moves forwardly to the right, looking at Fig. 3, bell crank 135 will be rotated in a clockwise direction thereby raising the bar 27. When the head 110 is rotated in an opposite direction thereby moving the nut 113 rearwardly or to the left, looking at Fig. 3, the bell crank 135 will be rotated in a counter-clockwise direction, thereby lowering the bar 27. Of course, as the bar 27 is raised, rod 50, the cross head 53, and the level indicator rod 57, are raised therewith, and, likewise, when the bar 27 is lowered the level indicator is lowered therewith.

It will now be understood that while the rod 50 may be raised relative to the bar 27 and may be held in the "0," "10," "20," "30" and "40" readings, the bar 27 together with the rod 50 may thereafter be raised to positions between "0" and "10," or between "10" and "20," or between "20" and "30," or between "30" and "40," or between "40" and "50." This is true irrespective of whether one is measuring for pints, quarts, one-half gallons or gallons.

Scale means is provided to permit accurate adjustment and accurate reading of the fine adjustment in the various positions. To this end block 100 is formed at its upper surface forwardly of extension 102 with a vertical aligned opening 150. The top plate 121 is formed with a vertical through-opening 151 vertically coaxial with the opening 150. Within the opening 151 is a bearing 152. Journalled in the bottom opening 150 and in bearing 152 is a vertical shaft 153. Pinned to the shaft 153 and disposed below the plate 121 is a worm wheel 154 meshing with the worm 111. Between the worm wheel 154 and the top surface 100a of block 100, and surrounding the shaft 153 is a coil compression spring 155.

Shaft 153 is formed at its upper end with a reduced screw threaded portion 156 projecting above plate 121. Below the threaded projections 156 is a shoulder. Mounted on the upper end of the shaft 153 is a circular metal plate 157 having a central opening through which the projection 156 extends. Said plate rests on the shoulder formed below said projection. Glued, or otherwise attached to the top of the plate 157 is a paper sheet 158. The plate 157 with the sheet 158 are clamped to the shaft 153 by means of a nut 159 screwed to the upper end of the threaded projection 156.

Marked on the sheet 158 are four concentric scales indicated by numerals 161, 162, 163 and 164, respectively. All of the scales have their beginning on a common radial line as shown in Fig. 8 of the drawing. The outermost scale 161 is for pint measurements. The next scale 162 is for measuring quarts, the next scale 163 is for measuring one-half gallons, and the scale 164 is for measuring gallons. It will be noted that the scale 161 has the least angular extent, the scale 162 has a greater angular extent, the scale 163 has a still greater angular extent, and the scale 164 has the greatest angular extent. Each of the scales is divided into ten parts, numbered from '1" to "10," and each part is divided into four parts indicating one-quarter, one-half, three-quarters and the whole part. These scales may be calibrated by turning the knob 110 for moving rod 150 through 40 equal distances between each of the five subdivisions on the rod 50 (on each of its four faces).

It will be noted that as the knob 110 is turned and the split nut 113 moves to the right, looking at Fig. 3, the bell crank 135 will raise the whole level indicating unit 25 and at the same time the scale disc 157, 158 will be rotated due to the engagement of the worm 111 with the work wheel 154. The "0" position of the pint scale 161 may register with a fixed mark, to be described hereinafter. At this time, the finger 141 of the lever 39 engages one of the notches in the pint face of the rod 50 and the reading on said face will either be "0," "10," "20," "30" or "40." Now if it is desired to raise the level indicator to any reading between "0" and "10" on the scale, above the "0," "10," "20," "30" or "40" reading at which the rod 50 is set, the knob 110 is then rotated in a direction for causing the scale disc 158 to rotate in a counterclockwise direction, looking at Fig. 8, until the desired scale reading is opposite a fixed mark. During this procedure, the whole level indicator unit 25 is raised to the desired height. Movement of the full scale 161 from "0" to "10" will move the level indicator unit from "0" to "10," or from "10" to "20" or from "20" to "30" or from "30" to "40" or from "40" to "50." The same procedure may be carried out for the quart, half gallon and gallon measurements.

It will be understood that a can 170 may be placed on the base plate 11 in such position that the rod 57 projects thereinto. Paint may be poured into the can 170 to the position of the mark 72. The level of the paint or liquid within the paint can may be readily brought to the level of the mark 72 because of the wire construction of member 65. To start the formula, the rod 50 is rotated to bring to the front, the face of the rod corresponding to the size can sought to be formulated. If it is a pint can which is to be formulated, the pint face of the rod is brought to the front. The knob 100 is rotated to bring the zero mark on the scale 161 opposite mark 165. The rod 50 is then brought down so that the "0" mark shows above the block 32. The knob 60 is then rotated to adjust the height of the rod 57 to the desired position. Some thinner is first placed in the can 170 as indicated at 171. The height of rod 57 is adjusted to bring the mark 72 to the level of the top surface of the thinner 171.

Let us assume that the formula of standard paints to be mixed is given as follows:

| | |
|---|---|
| White | 15¼ |
| Blue | 23¾ |
| Red | 37 |
| Green | 50 |

To execute this formula, the rod 50 is first raised relative to bar 27 to bring the "10" mark above the block 32. Scale 161 is of course used for pints. The scale 161 is hence brought to the zero position. The knob 110 is then rotated to bring the scale 161 to a reading of 5¼. Thus mark 72 has been raised to 15¼ which is the initial "10" on the lifted rod 50 and the additional 5¼ due to the turning of the scale. Of course, as the scale is turned, the whole unit 25 is lifted. White paint is then poured into the can to the level of the marking 72. Thereafter, the rod 50 is raised relative to bar 27 to the "20" mark and then the scale is turned to the 3¾ mark and blue paint is poured into the can to the mark 72. Thereafter, the rod 50 may be raised to the "30" mark and the scale turned to the 7 mark, giving a reading of 37, and red paint is poured to the mark 72. Thereafter, the rod 50 is raised to the "50" mark and the scale is turned to the "0" mark. Green paint may then be poured into the mark 72 completing the full pint.

The same procedure is carried out for quart, one-half gallons and gallons, the only difference being that the rod 50 must be turned relative to the cross head to bring the desired face to the front and also the corresponding scale must be used.

Means is provided to limit the movement of the split nut 113 to the right, looking at Fig. 3 of the drawing. To this end there is fixed to the shaft 108 between the worm 111 and the screw 112, a radial pin 180, and fixed to the rear face of the upper split nut 114 is a projection 181. The length of the projection 181 is such as to permit movement of the split nut to the left sufficiently to just pass the zero point on the scale before the pin 180 contacts the pin 181 to stop rotation of the shaft. Thus the movement of the scale just beyond the "0" position is stopped.

Extension 104 is formed with a screw threaded opening 104a in which is screwed a screw 104b adapted to be adjusted by turning the split nut to the right.

Means is provided to preselect one of the four scales on the disc 158 to correspond to the size of can to be formulated. To this end, there is attached to the rear surface of the post 13 as by screw 185 a plate 186 having an internal flange 187 at its upper end space above the level of the scale 158. The lower end of the plate 186 contacts the base plate 11. Also, mounted on the base plate 11 is a housing member 188 having side walls 189 and a front curved wall 190. The walls 189, 190 have inturned bottom flanges 189a, 190a contacting the upper surface of the plate 11. Said walls have inturned flanges 189b, 190b at their upper ends disposed at the same level as the flange 187. At the rear ends of the side walls 189 are flanges 189c which may be screwed to the back plate 186. The wall 190 is formed with an opening 190c through which the shaft 108 passes. Wall 190 is formed with an opening through which the screw 104b projects.

Mounted on top of plate 186 and housing wall 188 is a plate 191. The plate 191 has side, front and rear flanges 191a engaging the outer surfaces of member 188 and plate 186. It is formed at its rear end with a notch 193 to straddle post 13 of bar 27 and block 32. Top plate 191 may be attached to the back plate 186 and to housing wall 190 by screws 194 passing through suitable openings in the flanges 191a. Plate 191 is formed with an upwardly extending boss 196 having a flat upper surface 197. Extending up from the boss 196 is a sleeve 199. The through opening in the sleeve 199 and the boss 196 is coaxial with the shaft 153. The boss 196 is formed in its upper surface 197 with a plurality of equiangularly spaced substantially hemispherical depressions 200 for the purpose hereinafter appearing.

Extending through the through-opening 198 is a shaft 202. Fixed to the lower end of the shaft is a circular plate 203 disposed below wall 191 and above plate 157. Plate 203 is formed with a central boss 205 having at its underside a socket 207 to receive the nut 209 which is screwed to the threaded stem 156. Plate 203 is formed with four arcuate slots designated by numerals 210, 211, 212 and 213. These slots are at different radial distances from center and are angularly spaced.

At the center of slot 210 is a base mark 210a on plate 203 at which scale readings on scale 161 are made. Marks 211a, 212a, and 213a on plate 203 are at the center of slots 211, 212 and 213, respectively, for reading scales 162, 163 and 164, respectively.

The slot 210 is a window through which a portion of the pint scale 161 can be seen. The slot 211 is a window through which part of the quart scale 162 may be seen. The slot 212 constitutes a window through which part of the one-half gallon scale 163 may be seen, and slot 213 constitutes a window through which part of the gallon scale 164 may be seen. The plate 191 is formed with an opening or window 191a near the front thereof to permit viewing of parts of the scales 161, 162, 163, 164. A bezel 191b is fixed to the top of plate 191 and holds a glass window 191c in place to permit looking down into the casing.

It will now be understood that when the shaft 202 is rotated, the slots 210, 211, 212, 213 are successively brought to the front or beneath the window 191c. The slot selected is of course the one which will correspond to the size of can to be measured, that is, either pints, quarts, one-half gallons or gallons.

Means is provided to facilitate rotation of the shaft 202 and to hold the scale in one of four positions with one of the arcuate slots below the window 191. To this end there is fixed to the upper end of the shaft 202 a knob 220. Said knob is formed at its underside with a hole 221 in which is mounted a spring pressed ball 222. The ball will snap into one of the four depressions 200 in the boss 196.

Mounted on the top plate 191 is a casing 235 to encase the post 13, bar 27 and rod 50. Said casing may comprise a member 236 having a front wall 237 and side walls 238. Top plate 191 may be formed with flanges 240 received within the lower end of member 236 and may be attached thereto by screws 241. A back plate 242 closes the rear of member 236 and may be attached thereto in any suitable manner. The front wall 237 is formed with a longitudinal slot 244 to permit the pin 43 to move upwardly and downwardly as bar 27 is raised by the bell crank 135. The casing 235 is covered by a top plate 250 which may be attached to the post 13 by an elongated headed screw 251 screwed into the threaded opening 21. The head of the screw holds down the plate 250 which may be flanged to engage the walls 237, 238 and 242. The plate 250 is formed with a square through-opening 255 through which the bar 27 and block 32 may move when the bell crank 135 raises the bar 27 for fine adjustment and for the rod 50 to pass.

Attached to one of the side walls 238 of the casing member 236 is a bracket 260 supporting a lamp 261 which may shine down into the can 170 on the base 11 so as to illuminate the material within the can and the paint level indicator member 65. A switch 262 for operating the lamp 261 may be attached to the opposite wall 238. A bubble type leveling device 270 may be attached to the base plate 11 in one corner thereof by means of a screw 271. The leveling device 270 may be rotated about the screw 271 through an angle of 90° so as to insure leveling the base.

I claim:

1. In combination, a base, a post fixed thereto and extending upwardly therefrom, a slider slidably mounted on the post for vertical movement, a polygonal rod slidably mounted on said slider, said slider having means to slidably receive said rod, stop means at the lower end of the slider adapted to engage the lower end of the rod to support said rod on said slider, said rod being withdrawable from said receiving means by pulling said rod upwardly out of said slider, said slider being insertable into said receiving means in various angular positions about the axis of said rod, a cross head pivoted to the upper end of the rod, spring means to retain the cross head relative to said rod in various angular positions, and level indicating means mounted on a cross head and adapted to project downwardly into a can supported on said base, screw threaded means to raise said slider relative to said post, and releasable means to retain said rod in a plurality of vertically spaced positions relative to said slider in each of the angular positions of said rod relative to said slider.

2. In combination, a base, a post fixed thereto, a slider slidably mounted on said post, a rod slidably mounted on said slider, level indicating means having a portion connected to the upper end of said rod and being spaced parallelly thereto and projecting downwardly, means to retain said rod in equally spaced vertical positions relative to said slider, a screw rotatably mounted on said base, a nut engaging said screw and slidably relative to said base, a bell crank pivoted to the base and having an arm engaging said nut, and another arm engaging said slider.

3. The combination of claim 2, in combination with a worm rotatable with said screw, a worm wheel mounted for rotation on the base and engaging said worm, and a scale plate fixed to rotate with said worm wheel.

4. The combination of claim 1, in combination with a disc mounted for rotation above said scale plate coaxially therewith, and having a window opening adapted to uncover a portion of the scale on the scale plate.

5. In combination, a base, a post fixed thereto and extending upwardly therefrom, a slider slidably mounted on the post being formed with a polygonal opening, a polygonal rod slidable mounted within said opening, a stop at the lower end of the slider adapted to engage the lower end of the rod, said rod being withdrawable from said opening and reinsertable therein in a plurality of angular positions relative to said slider, a cross head pivoted to the upper end of said rod, spring means to retain the rod in various angular positions relative to said cross head, level indicating means on said cross head adapted to project into a can placed on said base, each face of said polygonal rod being formed with equally spaced notches, releasable means on said slider adapted to engage in said notches for retaining said rod at various heights relative to said slider in each of the angular positions of said rod relative to said slider, a horizontal shaft mounted on the base, a screw on said shaft, a nut engaging said screw and slidably engaging said base, a bell crank pivoted to the base and having an arm engaging said nut and a second arm engaging said bar, and a knob on said shaft for turning the latter whereby to move said bell crank for raising said slider.

6. The combination of claim 5, a vertical shaft mounted for rotation on said base, a worm on said horizontal shaft, a worm wheel on said vertical shaft meshing with said worm, a scale plate fixed to said vertical shaft and rotatable therewith, and a plurality of concentric scales on said scale plate having starting points on a common radius.

7. The combination of claim 6, in combination with a disc mounted for rotation relative to the base and disposed above said scale plate and being coaxial with said vertical shaft, and said disc formed with a plurality of arcuate openings spaced at different radial distances from the center and being angularly offset from one another to selectively uncover parts of said scales.

8. The combination of claim 7, and a casing mounted on said base and enclosing said disc and formed with a window opening whereby said arcuate openings in the disc will register with said window opening upon rotating said disc.

9. The combination of claim 5, and means to limit movement of the nut in opposite directions.

10. The combination of claim 5, said nut comprising a pair of half nuts, and means to resiliently press said half nuts against opposite sides of said screw.

References Cited in the file of this patent

UNITED STATES PATENTS

| | | |
|---|---|---|
| 924,668 | Jaques | June 15, 1909 |
| 1,283,681 | Cox | Nov. 5, 1918 |
| 1,414,183 | Cross | Apr. 25, 1922 |
| 2,275,577 | Weissert | Mar. 10, 1942 |
| 2,561,525 | McCauley | July 24, 1951 |
| 2,685,135 | Grubelic | Aug. 3, 1954 |

FOREIGN PATENTS

| | | |
|---|---|---|
| 363,430 | France | May 4, 1906 |
| 364,763 | Italy | Nov. 14, 1938 |
| 566,794 | Great Britain | Jan. 15, 1945 |
| 255,455 | Switzerland | Jan. 17, 1949 |